US011866838B2

(12) United States Patent
Chung et al.

(10) Patent No.: US 11,866,838 B2
(45) Date of Patent: Jan. 9, 2024

(54) METHOD FOR CREATING COLORFUL PATTERN ON METAL SURFACE

(71) Applicant: NATIONAL CHENG KUNG UNIVERSITY, Tainan (TW)

(72) Inventors: Chen-Kuei Chung, Tainan (TW); Chin-Jou Kuo, Tainan (TW); Wei-Hsuan Lin, Tainan (TW)

(73) Assignee: National Cheng Kung University, Tainan (TW)

( * ) Notice: Subject to any disclaimer, the term of this patent is extended or adjusted under 35 U.S.C. 154(b) by 32 days.

(21) Appl. No.: 17/325,519

(22) Filed: May 20, 2021

(65) Prior Publication Data

US 2022/0372645 A1 Nov. 24, 2022

(51) Int. Cl.

| | |
|---|---|
| ***C25D 11/12*** | (2006.01) |
| ***B41M 5/00*** | (2006.01) |
| ***C25D 11/10*** | (2006.01) |
| ***C25D 11/24*** | (2006.01) |
| ***C25D 11/08*** | (2006.01) |

(52) U.S. Cl.

CPC ........... *C25D 11/12* (2013.01); *B41M 5/0011* (2013.01); *B41M 5/0023* (2013.01); *B41M 5/0058* (2013.01); *C25D 11/08* (2013.01); *C25D 11/10* (2013.01); *C25D 11/24* (2013.01)

(58) Field of Classification Search

None

See application file for complete search history.

(56) References Cited

U.S. PATENT DOCUMENTS

| | | | | |
|---|---|---|---|---|
| 5,084,143 A * | 1/1992 | Smith | C25D 11/26 | 156/289 |
| 6,530,527 B1 * | 3/2003 | Ahlers | D21H 21/48 | 235/487 |
| 2003/0106201 A1 * | 6/2003 | Holloway | B44F 1/02 | 29/527.2 |
| 2003/0219609 A1 * | 11/2003 | Nishimura | C25D 5/02 | 428/629 |
| 2007/0212558 A1 * | 9/2007 | Gao | C25D 11/16 | 428/472 |
| 2008/0274375 A1 * | 11/2008 | Ng | C25D 11/024 | 205/330 |

(Continued)

OTHER PUBLICATIONS

English translation, CN 101836089, Oshida et al., Sep. 15, 2010 (Year: 2010).*

(Continued)

*Primary Examiner* — Stefanie S Wittenberg
(74) *Attorney, Agent, or Firm* — Rosenberg, Klein & Lee

(57) ABSTRACT

A method for creating colorful patterns on a metal surface by using colorless ink is revealed. First carry out a first anodizing process on a metal substrate to form a first anodic oxide layer on a surface of the metal substrate. Then coat a layer of colorless ink on the first anodic oxide layer on the surface of the metal substrate to form a colorless ink pattern mask. Later perform a second anodizing process to form a second anodic oxide layer on a part of the metal substrate without being covered with the colorless ink pattern mask. Next remove the colorless ink pattern mask and coat a metal film over the first anodic oxide layer and the second anodic oxide layer to get a colorful pattern on the metal substrate.

10 Claims, 6 Drawing Sheets
(4 of 6 Drawing Sheet(s) Filed in Color)

(56) References Cited

U.S. PATENT DOCUMENTS

| | | | | |
|---|---|---|---|---|
| 2011/0017602 | A1* | 1/2011 | Khosla | C25D 11/12 205/118 |
| 2013/0319865 | A1* | 12/2013 | Browning | B23P 17/02 205/171 |
| 2019/0276946 | A1* | 9/2019 | Fischer | C25D 11/024 |
| 2020/0131659 | A1* | 4/2020 | Chung | B01D 67/0065 |

OTHER PUBLICATIONS

English translation, CN 105063717, Bai et al., Nov. 18, 2015 (Year: 2015).*
English translation, CN 111107198, Wu, May 5, 2020 (Year: 2020).*
English translation WO 2017069748 (Year: 2017).*
English translation WO 2020159532 (Year: 2020).*
English translation EP 3000853 (Year: 2016).*
English translation JP63293195, Kawai, 1988 (Year: 1988).*
English translation CN103253072, Yang et al. 2013 (Year: 2013).*
English translation WO2016056470, Yamamoto et al., 2016 (Year: 2016).*

* cited by examiner

METHOD FOR CREATING COLORFUL PATTERN ON METAL SURFACE

BACKGROUND OF THE INVENTION

Field of the Invention

The present invention relates to a method for creating colorful patterns on a metal surface, especially to method for creating colorful patterns on a metal surface by using colorless ink in combination with digital printing technique. The patterns formed on the metal surface are not easy to fade and peeling off.

Description of Related Art

Printing technology has been widely applied to our daily lives such as printing patterns, words, barcodes, etc. on paper. Along with development of the printing technology, patterns can be printed on surface of non-paper material/objects. For example, digital printing presses are used to print patterns/words on surfaces of plastic products or metal objects. However, the surface tension (dyne per centimeter) is usually bigger and printing inks such as UV-cured ink have poor adhesion to the metal surface. During the printing process, UV-cured ink aggregates on the metal surface and the patterns printed are easy to peel off. Thus metal cross-linking agents are used for changing surface tension of the metal and increasing adhesion between the UV-cured ink and the metal surface in order to print patterns on the metal. Most of the commonly used crosslinking agents include polymers such as dicyandiamide resin, formalin, etc. which are not easily degraded and a long-lasting threat to the environment.

Moreover, colored UV-cured ink is printed on the metal surface by digital printing presses. Yet the adhesion force of such colored ink to the metal surface is lower than that of the colorless ink to the metal surface due to addition of other chemical agents such as pigments. The colors of the colored ink are unable to maintain on the metal surface for a long time. The chemical agents also lead to environmental issues. The technologies associated with printing of patterns/or colors on metal surface need to be improved.

Thus there is room for improvement and there is a need to provide a new method for creating colorful patterns on a metal surface.

SUMMARY OF THE INVENTION

Therefore it is a primary object of the present invention to provide a method for creating colorful patterns on a metal surface by using colorless ink through which the patterns on the metal surface are not easy to fade and peeling off. A layer of the colorless ink is coated on the pattern as a protective layer with features of oil and stain resistance, anti-sticking performance and corrosion resistance.

In order to achieve the above object, a method for creating colorful patterns on a metal surface by using colorless ink according to the present invention includes a plurality of steps. First carry out a first anodizing process on a metal substrate to form a first anodic oxide layer on a surface of the metal substrate. Then coat a layer of colorless ink on the first anodic oxide layer on the surface of the metal substrate to form a colorless ink pattern mask. Later perform a second anodizing process to form a second anodic oxide layer on a part of the metal substrate without being covered with the colorless ink pattern mask. Next remove the colorless ink pattern mask and coat a metal film on a surface of the first anodic oxide layer and a surface of the second anodic oxide layer to get a colorful pattern on the metal substrate.

Preferably, the metal substrate is made of aluminum or an aluminum alloy.

Preferably, an electrolyte solution used can be oxalic acid aqueous solution, sulfuric acid aqueous solution or phosphoric acid aqueous solution and positive and negative pulse voltages are applied at 25 degrees Celsius during the first anodizing process.

Preferably, an electrolyte solution used can be oxalic acid aqueous solution, sulfuric acid aqueous solution or phosphoric acid aqueous solution and positive and negative pulse voltages are applied at 25 degrees Celsius during the second anodizing process.

Preferably, the metal film is made of metal whose reflectivity is no less than 70%.

Preferably, the metal film is made of chromium, gold, silver, aluminum, or platinum.

Preferably, the thickness of the platinum film is 6-15 nm.

Preferably, the colorless ink used is ultraviolet (UV) cured ink.

Preferably, the colorless ink is coated on the first anodic oxide layer on the surface of the metal substrate by a printing machine in the second step.

Preferably, the printing machine is a digital printing press.

Preferably, a coating machine is used to coat the metal film on the surface of the first anodic oxide layer and the surface of the second anodic oxide layer in the step 5.

After the step 5, a surface of the metal film is coated with a layer of the colorless ink which forms a protective layer.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

In order to learn technical content and functions of the present invention more completely and clearly, please refer to the following embodiments with detailed descriptions together with the related figures and numbers therein.

Figure 1:
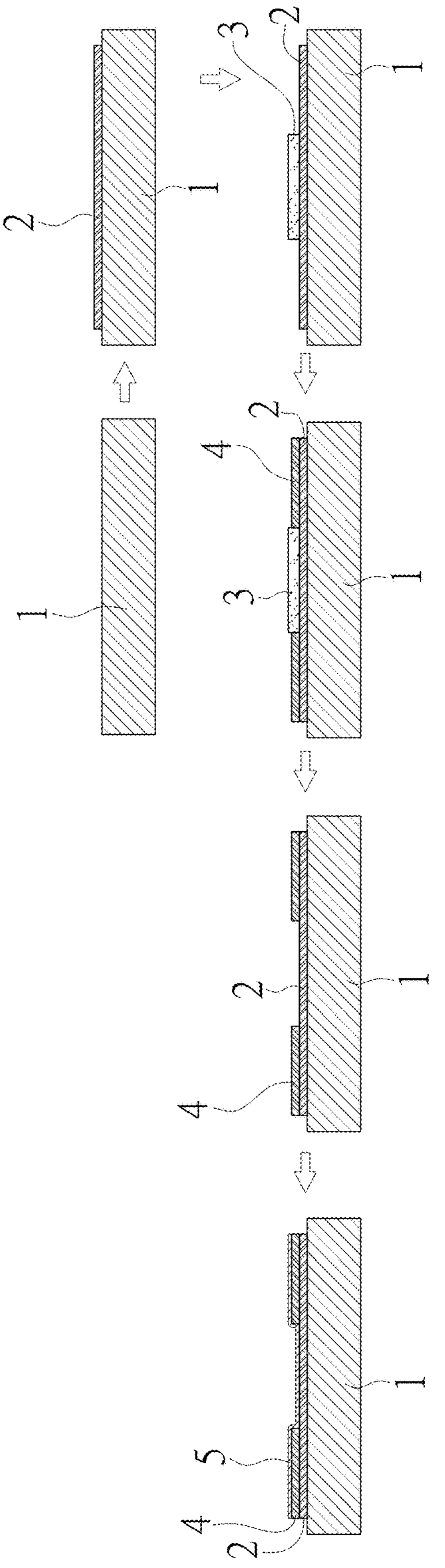
FIG. 1 is a flow chart showing steps of a method for generating colorful patterns on a metal surface of an embodiment according to the present invention.
Figure 2:
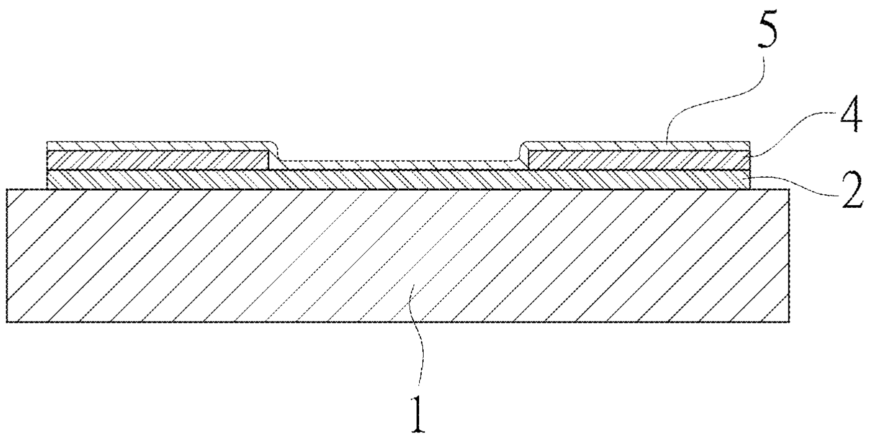
FIG. 2 is a schematic drawing showing a section of a colorless ink pattern on a metal surface according to the present invention.

Refer to FIG. 1, a method for creating colorful patterns on a metal surface by using colorless ink according to the present invention includes the following steps. Step 1: performing a first anodizing process on a metal substrate 1 to form a first anodic oxide layer 2 on a surface of the metal substrate 1. Step 2: coating a layer of colorless ink on the first anodic oxide layer 2 on the surface of the metal substrate 1 to form a colorless ink pattern mask 3. Step 3: performing a second anodizing process to form a second anodic oxide layer 4 on a part of the metal substrate 1 without being covered with the colorless ink pattern mask 3. Step 4: removing the colorless ink pattern mask 3. Step 5: coating a metal film 5 over the first anodic oxide layer 2 and the second anodic oxide layer 4 to get a colorful pattern on the metal substrate 1, as shown in FIG. 2. The metal substrate 1 is made of aluminum or alloy. An electrolyte solution used during the first anodizing process and the second anodizing process can be oxalic acid aqueous solution, sulfuric acid aqueous solution or phosphoric acid aqueous solution and positive and negative pulse voltages are applied at a temperature of 5-30 degrees Celsius. The metal film 5 is made of the metal whose reflectivity is no less than 70%. For example, the metal film 5 coated can be a platinum film with a thickness of 6-15 nanometers (nm). Moreover, in the step 2, a layer of colorless ink is coated on the first anodic oxide layer 2 by a printing machine such as digital printing press.

Embodiment One

In the following embodiments, alloy used is 1050 (registered international designation) aluminum alloy. Prepare and put an aluminum piece with a size of 60×40 $mm^2$ in deionized water. Ultra-sonication is used for surface cleaning of the aluminum piece, and then the aluminum piece is dried in the shade. The cleaned aluminum piece serves as an anode in the anodizing process which is carried out by positive and negative pulse voltages applied at 25° C. The positive voltage 40 V and the negative voltage −2 V are applied in turn with a cycle of 2 seconds (1 sec/1 sec). The anodizing electrolyte solution used is 0.3M oxalic acid aqueous solution and the oxidation time is 5 minutes. In this embodiment, an arbitrary waveform generator (WF1944A, Taiwan) and a power amplifier (Jiehan PPS-2150, Taiwan) are used to generate the voltages. A platinum mesh is served as a counter electrode and copper tape is used as a working electrode.

Take out, wash and dry the anodized aluminum piece. Now there is already an anodic oxide layer formed on a surface of the aluminum piece. Then use a digital printer and colorless ink as printing ink for coating a layer of colorless ink on a surface of the anodized aluminum piece and the layer of the colorless ink covering the anodic oxide layer is used as a pattern mask. The colorless ink used in this embodiment is ultraviolet (UV) cured ink. An aluminum piece without being treated by the anodizing process is also printed with a layer of the colorless ink by the digital printer and used as a control group.

Figure 3A:
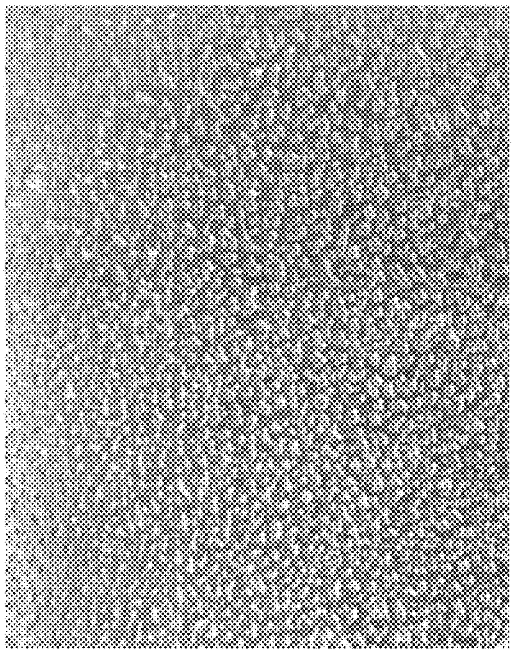
FIG. 3A is a photo showing colorless ink adhesion on a metal surface not treated by anodizing process of an embodiment according to the present invention.
Figure 3B:
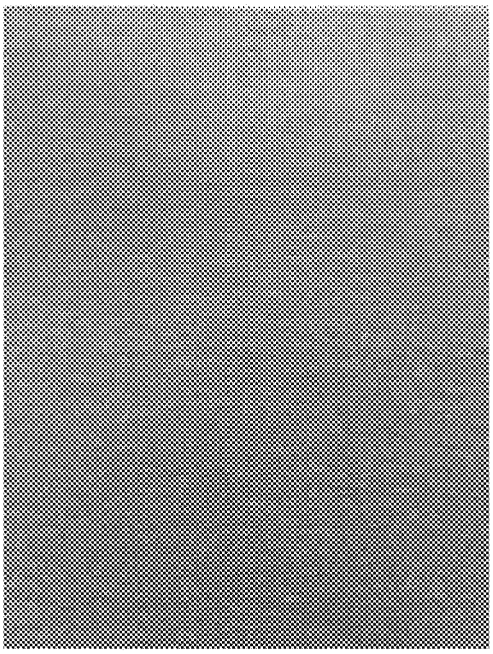
FIG. 3B is a photo showing colorless ink adhesion on a metal surface treated by anodizing process of an embodiment according to the present invention.

Refer to FIG. 3A, how the colorless ink is distributed on the surface of the aluminum piece without being treated by the anodizing process is revealed. It is observed that the colorless ink aggregates on the surface of the aluminum piece instead of being distributed evenly. Also refer to FIG. 3B, how the colorless ink is distributed on the surface of the aluminum piece treated by the anodizing process is disclosed. It is observed that the colorless ink is distributed evenly on the surface of the aluminum piece which has been anodized.

Embodiment Two

Take an aluminum piece with a size of 60×40 $mm^2$, put the aluminum piece in deionized water and treat the aluminum piece with ultra-sonication for surface cleaning. Then dry the aluminum piece in the shade. The cleaned aluminum piece serves as an anode in the anodizing process which is carried out by positive and negative pulse voltages applied at 25° C. The positive voltage 40 V and the negative voltage −2 V are applied in turn with a cycle of 2 seconds (1 sec/1 sec). The anodizing electrolyte solution used is 0.3M oxalic acid aqueous solution and the oxidation time is 80 seconds. In this embodiment, an arbitrary waveform generator (WF1944A, Taiwan) and a power amplifier (Jiehan PPS-2150, Taiwan) are used to generate the voltages. A platinum mesh is served as a counter electrode and copper tape is used as a working electrode.

Then use a digital printer for printing different colors (such as cyan, magenta, yellow, black and white (CMYKW)) of ink and colorless ink over surface of the anodized aluminum piece. Then the second anodizing process is carried out on the surface of the metal piece with different colors of ink and the colorless ink to observe the adhesion of various types of ink.

Figure 4:
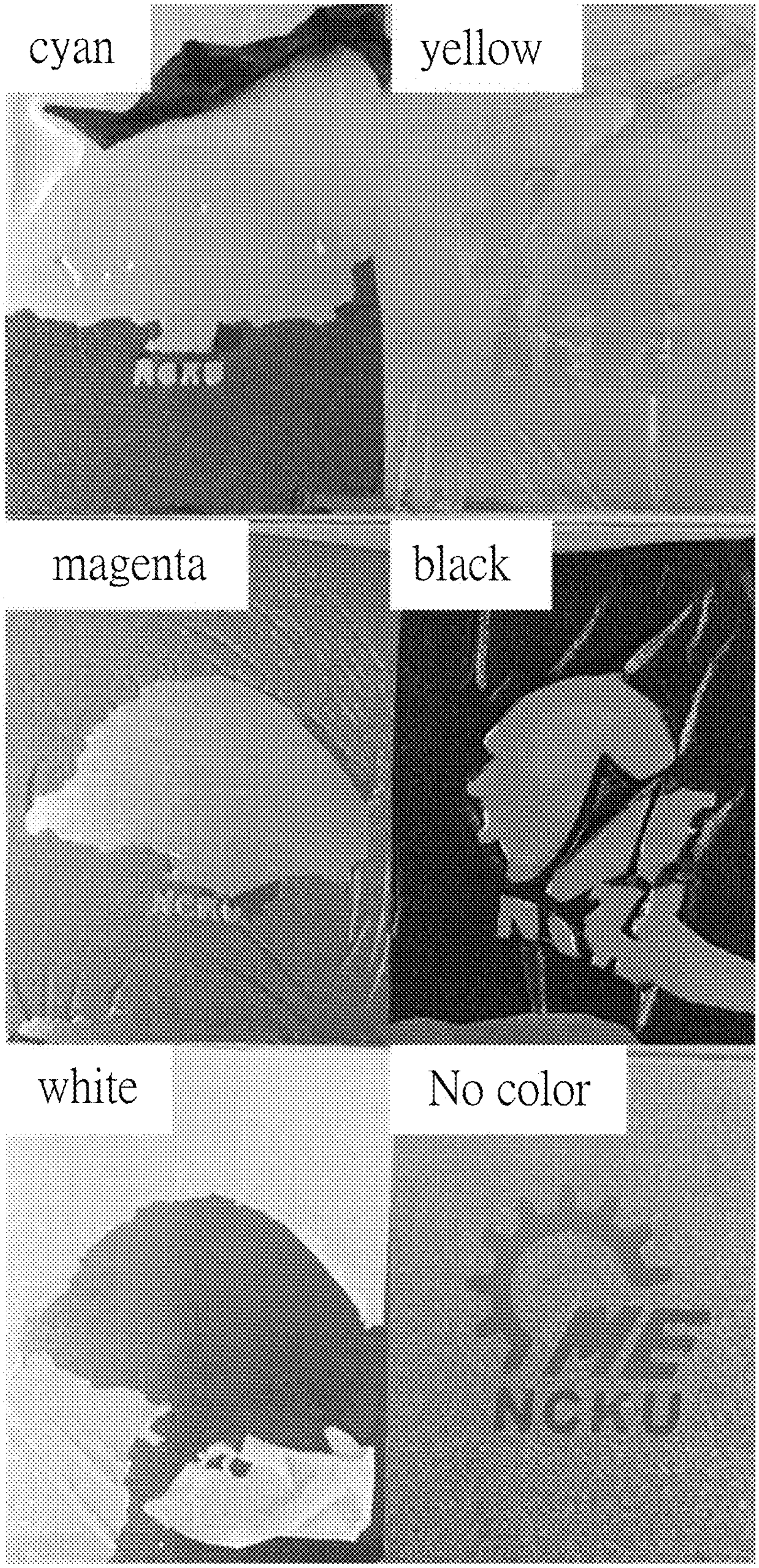
FIG. 4 is a photo showing adhesion of different colors of ink as well as colorless ink on a metal surface of an embodiment according to the present invention.

Refer to FIG. 4, the colored ink layer attached to the surface of the aluminum piece is obviously peeling off in the colored group printed with colored inks including cyan, magenta, yellow, black and white ink after the second anodizing process. Yet the colorless ink layer is still firmly adhered to the surface of the aluminum piece in the colorless group printed with the colorless ink, without peeling off after the second anodizing process.

Embodiment Three

Prepare and put an aluminum piece with a size of 60×40 $mm^2$ in deionized water. The aluminum piece includes an aluminum piece made of 1050 (registered international designation) aluminum alloy, commercial aluminum tape available on the market, and low-purity aluminum. Use ultra-sonication for surface cleaning of the aluminum piece and then dry in the shade. The cleaned aluminum piece serves as an anode in the first anodizing process which is carried out by positive and negative pulse voltages applied at 25° C. The positive voltage 40 V and the negative voltage −2 V are applied in turn with a cycle of 2 seconds (1 sec/1 sec). The anodizing electrolyte solution used is 0.3M oxalic acid aqueous solution and the oxidation time is 60 seconds to generate blue color on the surface of the aluminum piece. In this embodiment, an arbitrary waveform generator (WF1944A, Taiwan) and a power amplifier (Jiehan PPS-2150, Taiwan) are used to generate the voltages. A platinum mesh is served as a counter electrode and copper tape is used as a working electrode.

Then use a digital printer and colorless ink for coating colorless ink patterns on surface of the anodized aluminum piece to form a colorless ink pattern mask.

The above aluminum piece serves as an anode in the second anodizing process to form a second anodic oxide layer. The second anodizing process is carried out by positive and negative pulse voltages applied at 25° C. The positive voltage 40 V and the negative voltage −2 V are applied in turn with a cycle of 2 seconds (1 sec/1 sec). The anodizing electrolyte solution used is 0.3M oxalic acid aqueous solution and the oxidation time is 160 seconds to create green color on the surface of the aluminum piece. In this embodiment, an arbitrary waveform generator (WF1944A, Taiwan) and a power amplifier (Jiehan PPS-2150, Taiwan) are used to generate the voltages. A platinum mesh is served as a counter electrode and copper tape is used as a working electrode.

Lastly take the aluminum piece out after the second anodizing process, clean and dry it. Then remove the pattern mask formed by the colorless ink and use a coating machine to coat a platinum film with the thickness of 6-15 nm on the surface of the aluminum piece for increasing saturation of colors on the surface of the aluminum piece.

Figure 5:
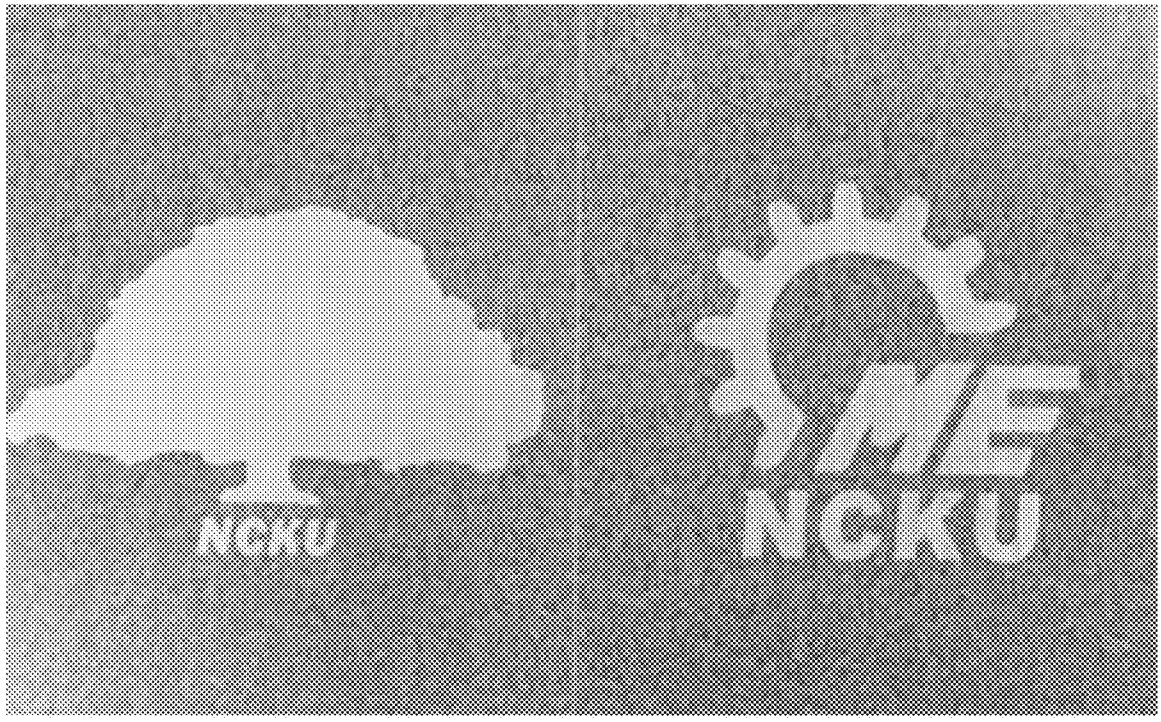
FIG. 5 is a photo showing colorful patterns on a metal surface created by using colorless ink of an embodiment according to the present invention.

The product obtained is shown in FIG. 5. The above method really makes clear patterns on the surface of the aluminum piece.

Embodiment Four

Prepare and put a 1050 aluminum alloy piece with a size of 60×40 $mm^2$ in deionized water. Use ultra-sonication for surface cleaning of the aluminum piece and then dry in the shade. The cleaned aluminum piece serves as an anode in the anodizing process which is carried out by applying positive and negative pulse voltages at 25° C. The positive voltage 40 V and the negative voltage −2 V are applied in turn with a cycle of 2 seconds (1 sec/1 sec). The anodizing electrolyte solution used is 0.3M oxalic acid aqueous solution and the oxidation time is 210 seconds. In this embodiment, an arbitrary waveform generator (WF1944A, Taiwan) and a power amplifier (Jiehan PPS-2150, Taiwan) are used to generate the voltages. A platinum mesh is served as a counter electrode and copper tape is used as a working electrode.

Take the anodized aluminum piece out, clean and dry it. Then use a coating machine to coat a platinum film with the thickness of 6-15 nm on the surface of the aluminum piece for increasing saturation of colors on the surface of the aluminum.

Then use a digital printer and the colorless ink for coating colorless ink patterns on surface of the aluminum piece coated with the metal film to form a layer of colorless ink. Carry out stain resistance test and anti-sticking test on the surface of the product obtained.

Figure 6A:
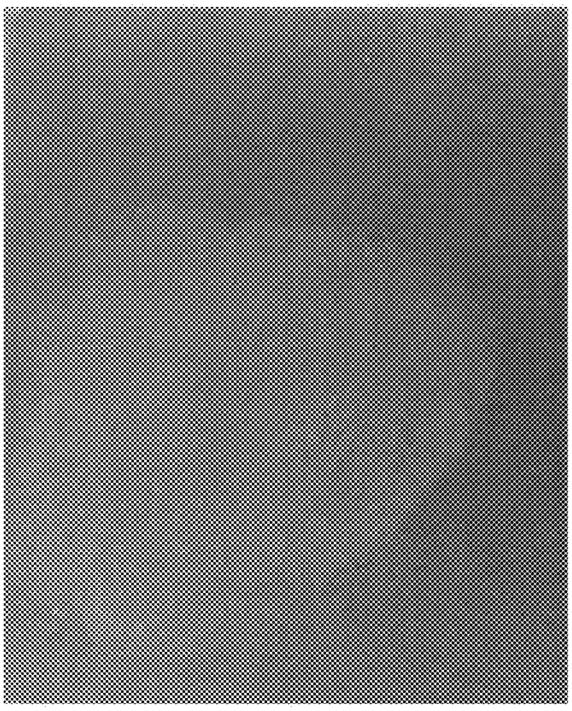
FIG. 6A is a photo showing a metal surface without printed with a layer of the colorless ink.
Figure 6B:
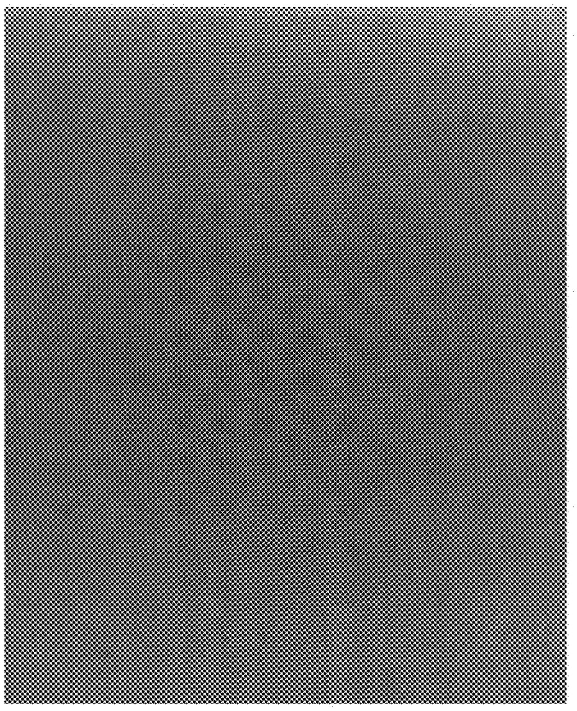
FIG. 6B is a photo showing a layer of colorless ink on a metal surface used as the protective layer of an embodiment according to the present invention.

Refer to FIG. 6A, a surface of an aluminum alloy plate coated with a colored layer while without printed with a layer of the colorless ink is revealed and a fingerprint left on the surface of the aluminum alloy plate is observed clearly. As to FIG. 6B, a surface of an aluminum alloy plate coated with a colored layer and printed with a layer of the colorless ink is disclosed and there is no obvious fingerprint or trace on the surface of the aluminum alloy plate. This means the printed layer of the colorless ink can also be used as the protective layer In summary, a method for creating colorful patterns on a metal surface by using colorless ink according to the present invention includes a plurality of steps. Carry out the first anodizing process to form an anodic aluminum oxide (AAO) layer on an aluminum surface for improving adhesion of the colorless ink. No substance harmful to the environment such as crosslinking agent is used during the anodizing process. Then a colorless ink pattern is printed on surface of the anodized aluminum in a digital manner and used as a mask for the AAO layer. Next perform the second anodizing process and coat a metal film to make the colorful pattern on the metal surface have high resolution, high saturation and no fade out. The color of the pattern formed on the present invention is not shown by the ink so that the environmental pollution caused by chemical agents added in the different colors of ink. Moreover, the present method can form clear patterns on the metal surface, not easily peeling off. The patterns obtained are further coated with a layer of the colorless ink for oil and stain resistance, anti-sticking performance and corrosion resistance.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A method for creating colorful patterns on a metal surface comprising the steps of:

Step one: carrying out a first anodizing process on a metal substrate to form a first anodic oxide layer on a surface of the metal substrate;

Step two: subsequent to the first anodizing process, coating, by a printing machine, a layer of a colorless ink devoid of color defining agents on the first anodic oxide layer on the surface of the metal substrate to form a colorless ink pattern mask, wherein the first anodic oxide layer is sandwiched between the metal substrate and the colorless ink pattern mask;

Step three: performing a second anodizing process to form a second anodic oxide layer on a part of the first anodic oxide layer on the metal substrate not covered with the colorless ink pattern mask;

Step four: removing the colorless ink pattern mask; and

Step five: coating a metal film on a surface of the first anodic oxide layer and a surface of the second anodic oxide layer.

2. The method as claimed in claim 1, wherein the metal substrate is made of aluminum or an aluminum alloy.

3. The method as claimed in claim 1, further comprising: during the first anodizing process, using an electrolyte solution selected from the group consisting of oxalic acid aqueous solution, sulfuric acid aqueous solution and phosphoric acid aqueous solution, and applying positive and negative pulse voltages at 5-30 degrees Celsius.

4. The method as claimed in claim 1, further comprising: during the second anodizing process, using an electrolyte solution selected from the group consisting of oxalic acid aqueous solution, sulfuric acid aqueous solution and phosphoric acid aqueous solution, and applying positive and negative pulse voltages at 5-30 degrees Celsius.

5. The method as claimed in claim 1, wherein the metal film is made of metal whose reflectivity is no less than 70%.

6. The method as claimed in claim 1, wherein thickness of the metal film is 6-15 nanometers (nm).

7. The method as claimed in claim 1, wherein the colorless ink is an ultraviolet (UV) cured ink.

8. The method as claimed in claim 1, further comprising: subsequent to the step five, further coating a surface of the metal film with a layer of the colorless ink which forms a protective layer.

9. The method as claimed in claim 1, further comprising: in step five, coating the metal film on the surface of the first anodic oxide layer and the surface of the second anodic oxide layer by a coating machine.

10. The method as claimed in claim 1, wherein the printing machine is a digital printing press.

* * * * *